United States Patent [19]

Ross

[11] Patent Number: 5,685,151
[45] Date of Patent: Nov. 11, 1997

[54] U.S. SOLAR POWER SUPPLY

[76] Inventor: Randy Ross, Rte. 2, Box 403, Warrenton, Va. 22186

[21] Appl. No.: 314,308

[22] Filed: Sep. 30, 1994

[51] Int. Cl.$^6$ .................................................. F03G 7/02
[52] U.S. Cl. .................... 60/641.8; 60/641.15; 60/659
[58] Field of Search .................... 60/641.8, 641.15, 60/651, 659; 126/569, 600

[56] References Cited

U.S. PATENT DOCUMENTS

| | | | |
|---|---|---|---|
| 495,163 | 4/1893 | Severy | 126/600 |
| 1,424,932 | 8/1922 | Moreau | 60/641.15 |
| 3,999,389 | 12/1976 | Bryce | 126/600 |
| 4,010,732 | 3/1977 | Sawata et al. | 60/641.15 |
| 4,158,354 | 6/1979 | Carden | 126/690 |
| 4,192,144 | 3/1980 | Pierce | 60/641.8 |
| 4,200,148 | 4/1980 | Friefeld et al. | 60/641.8 |
| 4,232,523 | 11/1980 | Derby et al. | 60/641.15 |
| 4,335,578 | 6/1982 | Osborn et al. | 60/641.8 |
| 4,394,814 | 7/1983 | Wardman et al. | 60/641.15 |
| 4,454,865 | 6/1984 | Tammen | 126/690 |
| 4,586,487 | 5/1986 | Argoud et al. | 126/690 |
| 4,876,854 | 10/1989 | Owens | 60/641.8 |
| 4,947,825 | 8/1990 | Moriarty | 60/641.15 |
| 4,977,744 | 12/1990 | Lenz | 60/641.15 |
| 5,133,191 | 7/1992 | Bruhn et al. | 60/659 |
| 5,267,288 | 11/1993 | Frutschi et al. | 60/644.1 |
| 5,269,145 | 12/1993 | Krause et al. | 60/659 |
| 5,323,764 | 6/1994 | Karni et al. | 126/690 |

*Primary Examiner*—Ira S. Lazarus
*Assistant Examiner*—Alfred Basichas
*Attorney, Agent, or Firm*—Aquilino & Welsh

[57] ABSTRACT

A method and apparatus for collecting, converting, storing and using solar energy includes solar energy concentrating apparatus, a first apparatus containing a first fluid for transferring heat from the concentrating apparatus to heat exchange apparatus, a heat storage medium fluidly interacting with the heat exchange apparatus for storing the transferred heat, a second apparatus fluidly interacting with the heat exchange apparatus and containing a second fluid for transferring heat from the heat storage medium to a work producing mechanism. The heat storage medium is sodium chloride, and the first fluid is sodium in liquid and vapor states.

18 Claims, 8 Drawing Sheets

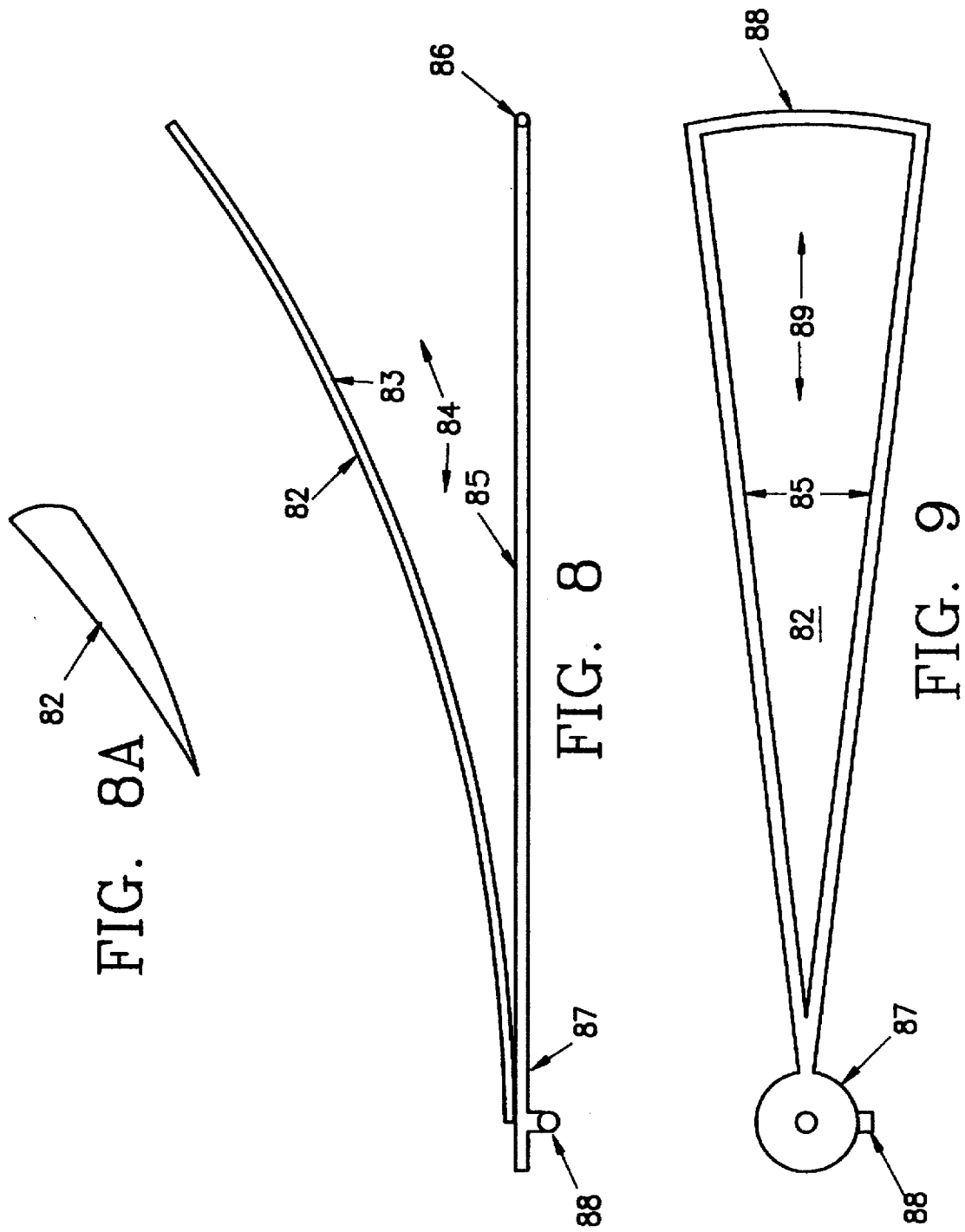

U.S. SOLAR POWER SUPPLY

FIELD OF THE INVENTION

The present invention relates to energy capture and conversion systems that produce mechanical or electrical energy from solar energy, and more particularly to an energy collection storage and conversion system that transforms solar energy stored in a cavity boiler into thermal energy and then facilitates conversion to an energy form for driving a Carnot or Rankine engine coupled to a generator to produce electrical energy upon demand.

BACKGROUND OF THE INVENTION

As early as the late 1880's, devices were known for the collection of solar energy using concentrators, and blackbody absorbers to boil working fluids for driving thermodynamic engines. As these devices evolved, thermal batteries containing rocks or other materials to store energy, thus making it available to drive the engines when the solar energy was not obtainable. Widespread commercial use of solar energy was not attained because these devices were too large and costly for the amount of power they produced. Moreover, the power these devices actually did produce was intermittent, and thereby unreliable, necessitating the use of a conventional backup source of power for night or extended cloudy periods.

There are a number of well-known problems associated with conventional apparatus for converting solar energy to usable power. These include low efficiencies associated with solar energy capture, solar energy transfer, and thermodynamic conversion of the solar energy, via conventional Rankine cycle, into usable power. Improving the efficiency of any of these steps in energy capture and conversion reduces the size of the solar collector and its initial cost. Maximizing the efficiency of all the steps of energy capture and conversion reduces the size of the solar collector to some practical minimum limit per unit energy output.

There are approximately eighteen efficiencies associated with known steps of solar energy capture and conversion, including (1) initial solar energy interception via solar tracking, (2) net solar flux to reflector after structure shadowing, (3) mirror area efficiency after gaps between reflective elements, (4) reflective efficiency of reflector surface, (5) reflectivity wear factor due to surface degradation from environmental abrasives, (6) cleanliness efficiency of reflector surface, (7) normal specular reflectivity of reflector material, (8) net reflected energy delivery to blackbody boiler efficiency after alignment errors, (9) blackbody boiler initial energy capture efficiency, (10) blackbody net energy retention efficiency after re-radiation, convection, and conduction losses, (11) absorbed energy transfer to thermal storage efficiency after heat losses from transfer pipe, (12) energy retention in thermal storage efficiency, (13) energy delivery from thermal storage to engine efficiency, (14) thermodynamic Rankine energy conversion efficiency, (15) mechanical efficiency of the Rankine engine after friction, (16) efficiency after energy use for solar tracking, (17) efficiency after energy use for the pumping of working fluids, and (18) the efficiency of the generator in converting mechanical energy to electricity.

To illustrate how important efficiency is in each step of the conversion process, for the sake of discussion assume that there are two hypothetical devices, the first of which exhibits 90% efficiency in each step of the conversion process, and the second in which each step is 80% efficient.

The efficiency of the first device E would be:

$$E=(0.9)^{18}=15.01\%$$

The efficiency of the second device E' would be:

$$E'=(0.8)^{18}=1.8\%$$

The second device would only convert 1.8% of the solar energy available to it to useful work. To produce the same amount of work as the first device, the second device would have to be 8.34 times bigger and occupy 8.34 times as much real estate. Therefore, the efficiency of each step in the conversion process is important if size and cost of the solar conversion device is to be minimized.

OBJECTS OF THE PRESENT INVENTION

It is therefore a principal object of the present invention to provide a method and apparatus which will maximize the overall efficiency of the process of converting solar energy to usable power, while overcoming all the disadvantages and drawbacks of known methods of solar energy conversion.

Another object of the present invention is to provide a method and apparatus for capturing and storing solar thermal energy within a storage tank containing molten sodium chloride, and for using the stored thermal energy to drive a Carnot or Rankine engine to produce usable power.

Still another object is to provide an apparatus which will facilitate efficient, long term energy storage, for periods ranging from weeks for small units, to months or even years for larger units, at markedly lower costs than any known storage systems, thereby eliminating the need for conventional backup power production facilities, reducing costs, and permitting dependable, continuous power in a stand-alone capacity.

These and other objects are attained by the present invention which encompasses a method and an apparatus for intercepting, concentrating, and storing solar-derived thermal energy within a storage tank filled with sodium chloride, and using the stored energy to power a Carnot or Rankine engine to produce a work by-product. The apparatus for intercepting and concentrating the solar energy is a reflective dish, preferably parabolic in shape, which focuses solar rays into a cavity-type solar boiler. The concentrated solar energy is absorbed by the interior walls of the boiler, fabricated from pipes that carry liquid sodium. Trace amounts of potassium may be used to keep the temperature of vaporization from rising too far. The absorbed energy is transferred through the pipe walls to the liquid sodium which in turn boils. The sodium vapor is piped into and through a tank filled with sodium chloride where the sodium's energy of vaporization is transferred to the sodium chloride via a first heat exchanger. This device is the means for transferring the captured solar energy to the thermal storage. As the sodium chloride absorbs the energy from the sodium vapor inside the pipes, the sodium vapor condenses back to liquid sodium. This condensed fluid is then pumped back to the solar boiler, and the sodium chloride in contact with the pipes melts thereby storing the energy in the sodium chloride's heat of fusion. Energy is withdrawn from the thermal storage tank when required, by running high pressure water lines through the tank in pipes that comprise a second heat exchanger which enables energy removal from the thermal storage means. The water in the pipes absorb thermal energy from the hotter salt causing it to boil generating high pressure steam. The steam is then piped to a turbine where the thermal energy is converted to mechanical motion, and subsequently used to drive an electricity producing generator.

BRIEF DESCRIPTION OF THE DRAWINGS

These and other objects and advantages of the present invention will become more apparent when considered together with the following detailed description of the invention along the appended drawings, in which:

FIG. 8 is a schematic side view of an individual pie-shaped reflector element in combination with the reflector support structure and the elements which comprise the air-cooled condenser in aggregate; and FIG. 9 is a schematic bottom view of the individual pie-shaped reflector element showing its support structure and the elements of the air-cooled condenser.

DETAILED DESCRIPTION OF THE INVENTION

Figure 1:
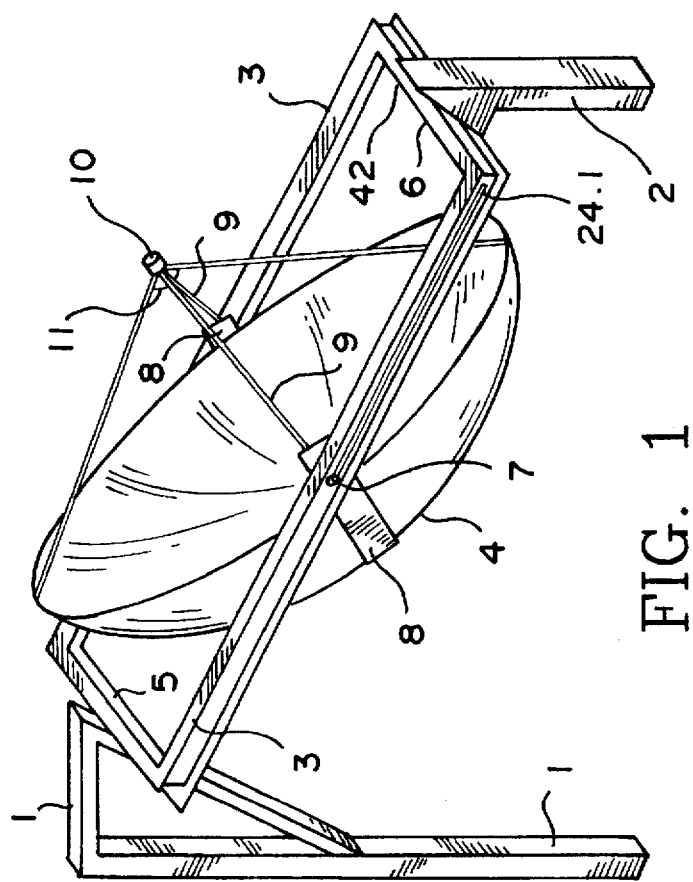
FIG. 1 is a perspective view of the solar energy collecting apparatus of the present invention.

Referring first to FIG. 1, there is shown, in a perspective view, the solar energy collecting apparatus of the present invention including at least two vertically-oriented support columns or towers 1,2 and a generally rectangular collector supporting frame assembly 3 carried, at some predetermined height above the ground, on the support columns or towers. Although only one pair of support columns 1 and 2 have been illustrated, it is to be understood that each single support column could be replaced by a set of two or more individual towers disposed at predetermined locations along the a respective edge of the frame assembly. Preferably, the support columns and the supporting frame assembly are fabricated from durable and sturdy material, such as high strength structural steel.

A parabolic reflector 4 is supported by the frame assembly 3 in a manner to be described below, and is comprised of a plurality of pie-shaped elements 82 (see also FIGS. 4a, 8 and 9). The elements are preferably fabricated from a durable material having high reflectivity. One example of such a material is Alcoa reflector sheet bearing an Alcoa Bright Dip Number 5 finish.

Figure 1A:
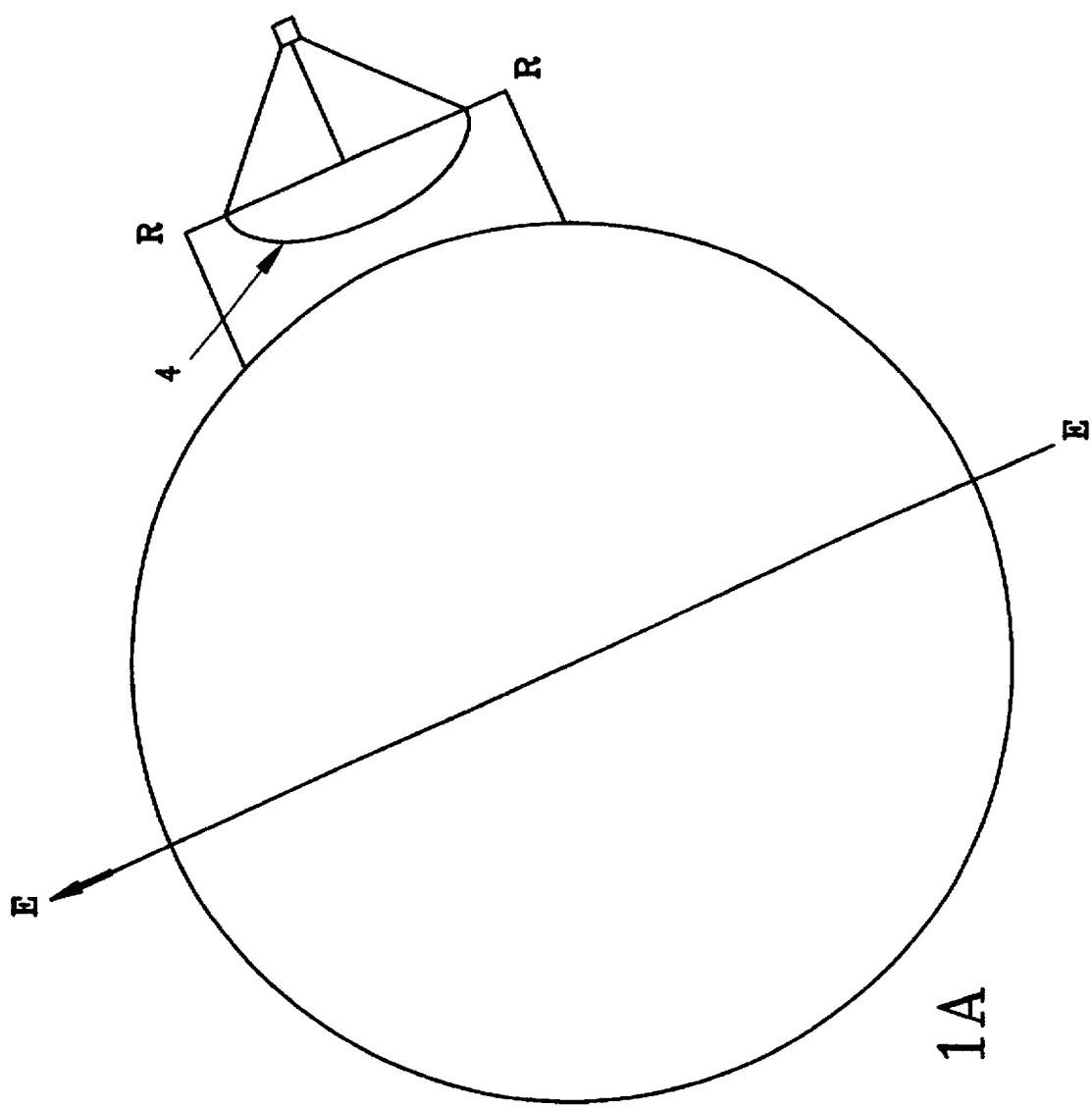
FIG. 1a schematically shows the reflector position relative to the earth's axis of rotation.

The reflector 4 is mounted (see FIG. 1a) for rotation about an axis R—R which is parallel to the earth's axis E—E. The axis R—R is defined by an imaginary line connecting gimbals located at attachment points 5 and 6 where the frame assembly 3 pivotally connects with the towers 1 and 2, respectively. Attachment points 5 and 6 are located on opposite sides of the frame assembly 3.

In order to optimize its sun-tracking operation, the reflector 4 should be positioned such that the axis R—R is located parallel to the earth's (daily) axis of rotation E—E. The transverse support 8 is pivotally coupled to the frame assembly at 7, 7', and provides a cradle-like support for the reflector undercarriage which comprises a truss network, preferably in the shape of a parabola and composed of aluminum channel members.

Boiler supports 9, fabricated from a suitable high strength material, such as structural steel, provide support for a cylindrical main solar boiler 10 and a conical brim boiler 11, both described in detail below.

Figure 2:
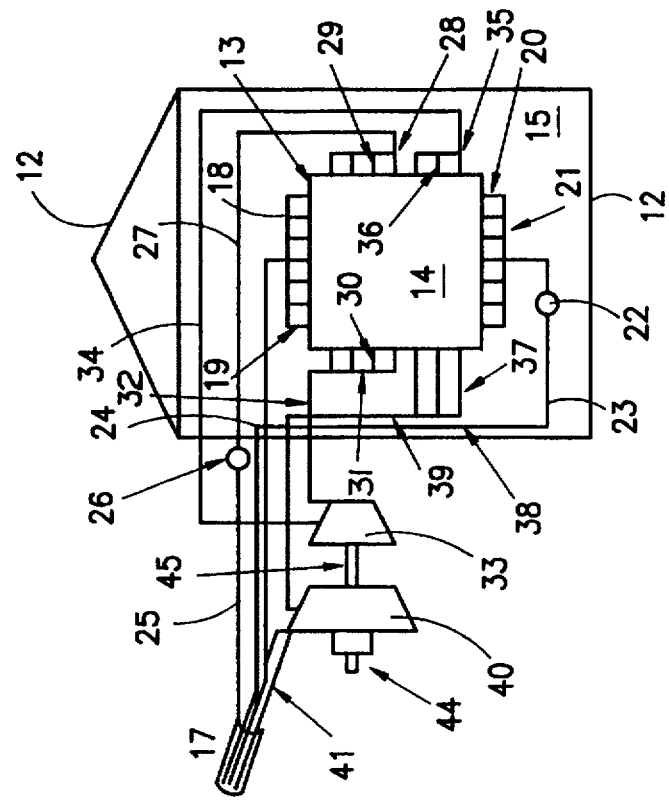
FIG. 2 schematically illustrates the high temperature thermal storage system which is contemplated by the system of the present invention.

FIG. 2 shows a high temperature thermal storage system 12 (HTTSS) which houses a thermal storage thank 13, composed of Inconal or other suitable alloy, containing sodium chloride (NaCl) thermal storage material 14. Insulation 15 is disposed between the outer housing and the thermal storage tank. The insulation is provided in layers with insulating material having high temperature service disposed near the thermal storage tank and insulating material having lower temperature service disposed near the the outer casing of the thermal storage system 12. A sodium vapor tubing or line 16, formed of a material typically used in all sodium handling lines (as for example Inconel or Hastalloy) extends from one of the support members to sodium headers 18. Sodium vapor comes from liquid that is vaporized in the sodium boiler. Sodium vapor lines 19 interconnect with headers 18 with the thermal storage tank 13. Sodium condensate lines 20 (the condensate is created when the vapor is run through lines next to colder salt in the thermal storage tank) extend between the thermal storage tank and the sodium condensate headers 21 (see FIG. 5a in which the sodium condensate lines 20 emerge from the bottom of the salt-filled tank and connect with the sodium condensate headers 21 so as to gather all the sodium condensate into one line). A conventional electro-magnetic sodium fluid pump 22 forces sodium through a fluid line 23 to a counter flow line 24 where it is regeneratively heated by the vapor line contained within it. Since sodium condensate generally occurs at approximately 1475 degrees Fahrenheit, a temperature which is too high for most mechanical pump materials, electromagnetic pump 22 allows this hot fluid to be pumped without the use of moving parts. The sodium is then pumped back through the cylindrical support housing 2, along the counter flow line 24.1 supported on the frame assembly 3, through the shaft of gimbal 7 to the boiler support 9. From there, it enters pipes (not shown) lining the cylindrical portion of the solar boiler 10.

Figure 3:
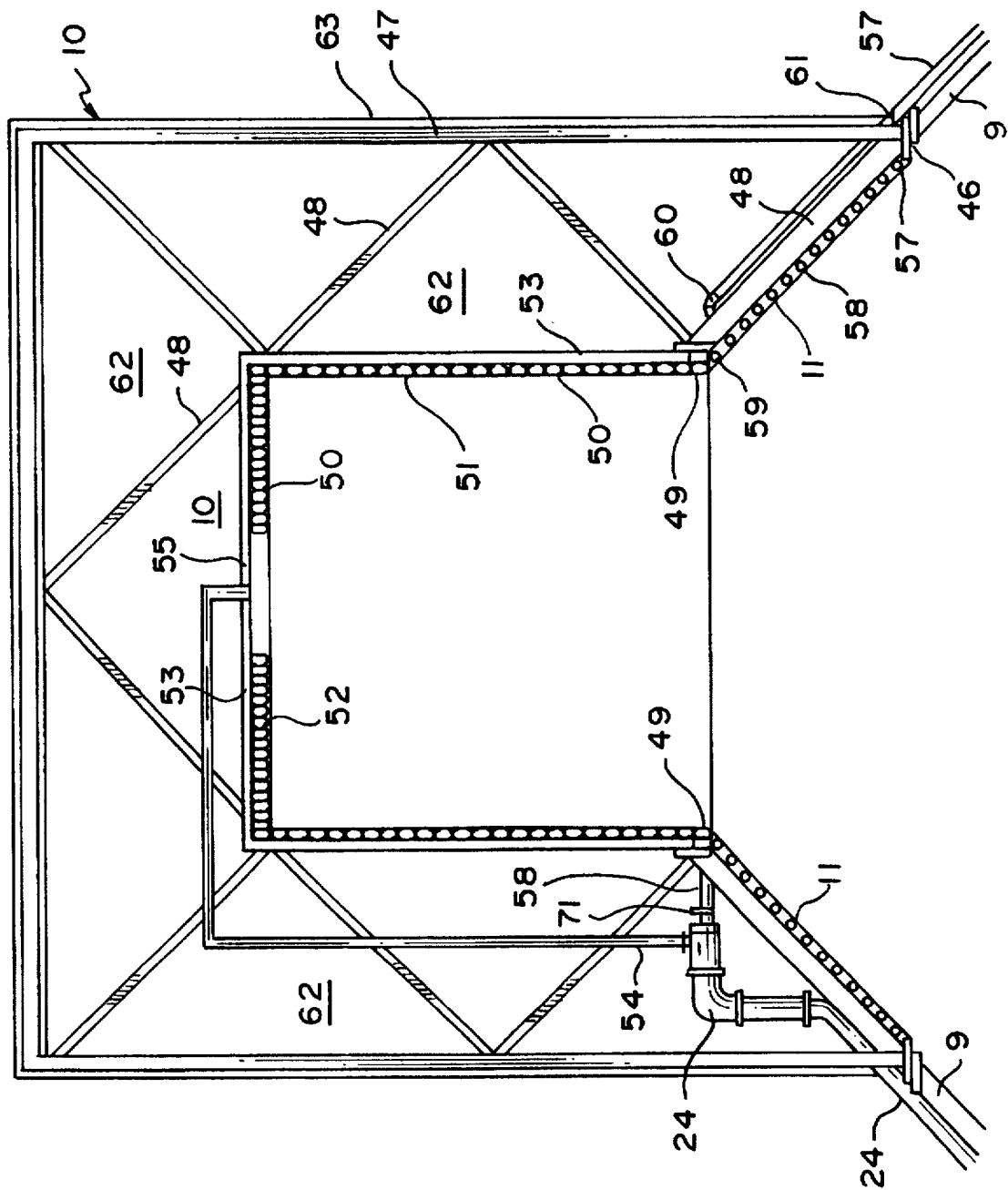
FIG. 3 is a side sectional view of the cavity black body solar boiler used with the present invention.

Referring now to FIG. 3, the sodium vapor exits the solar boiler 10 through lines 56 and flows down counter flow pipes located inside the sodium fluid pipe 24 disposed adjacent the boiler supports 9. The vapor then passes through the gimbal shaft 7 (FIG. 1), along a counter flow line 24.1 carried by the frame assembly 3 and through a cylindrical support housing 17 (see FIGS. 1 and 2) where it is returned to a sodium vapor header 18. Referring again to FIG. 2, a conduit 25 extends from the support housing 17 to a high pressure feed water pump 26. The conduit or pipe 25 carries water condensate under low pressure and is most preferably fabricated from low grade stainless steel. A high pressure feed water conduit 27 is regeneratively heated by several feed water heaters (not shown) with partial steam bleeds from both the high and medium pressure sections of the turbine, 40 and 33 respectively. High pressure feed water conduit 27 connects with the high pressure water headers 28 which in turn connect with the high pressure boiler pipes 29. These conduits are most preferably fashioned from high grade stainless steel and pass into and through the thermal storage tank. The high pressure, high temperature steam pipes or conduits 30 connect with the high pressure, high temperature steam headers 31. In turn, the steam headers 31 communicate with the high pressure, high temperature steam line 32, and thereafter, with the high pressure section of the turbine 33. A medium pressure, medium temperature steam line 34 is connected between the high pressure section of the turbine 33 and the medium pressure, medium temperature boiler pipes 36, with the latter running into and through the thermal storage tank 14. High temperature, medium pressure boiler pipes 37 extend from the thermal storage tank 14 and is coupled with the medium pressure, high temperature headers 38. The headers 38 connect with the high temperature, medium pressure steam line 39 which is coupled with the medium pressure section of the turbine 40. A low pressure, low temperature turbine exhaust steam line 41, preferably composed of low grade stainless steel or other such suitable alloy, extends through the cylindrical support housing 17. The exhaust steam from line 41 travels along the supporting frame assembly 3, and then enters the reflector at the gimbal shaft which connects the reflector to the supporting frame assembly. The low pressure, low temperature steam line 41 thus fluidly connects with an air-cooled condenser composed of the plurality of pipes under the outer edge of the reflector 4. Air cooled condenser pipes (elements 83, 84, and 85 in FIG. 8) connect to a condenser manifold (element 87 in FIGS. 8 and 9) under the center of the reflector (shown at 89 in FIG. 8) which connects to the low pressure water line (element 88 in FIGS. 8 and 9). Line 88 follows a counter-flow course with the turbine exhaust steam back through the the same path from which it came, and emerging from the reflector assembly through line 25. A generator 44 is coupled to both the medium pressure section of turbine 40 and the high pressure section of turbine 33 by the shaft 45.

Referring again to FIGS. 3 and 4, the high temperature cylindrical cavity solar boiler 10 includes a secondary boiler 11 (FIG. 3) mounted atop boiler supports 9 on adjustment plates 46. These plates are preferably comprised of high temperature duty structural steel. Inside the solar boiler 10 are housing supports 47 preferably composed of high temperature heavy duty structural steel, and boiler shape-maintaining supports 48 preferably composed of Inconel or other alloy suitable for very high temperature service. The open cylindrical aperture 49 (FIG. 3) admits solar radiation which is focused and reflected from the plural reflector elements to the cylindrical cavity of the boiler. The solar radiation is absorbed by an inner surface 50 which may be formed as either a heat oxidized and blackened surface or a very thin solar radiation absorbing selective surface of well-known variety disposed on top of channel tubing 51. The channel tubing is preferably composed of Inconel or Hastelloy or other "super alloy" suitable for very high temperature service, severe cycling, and moderately high corrosion potential due to sodium vaporization. Further, the channel tubing has the configuration of a helical coil and forms a cylinder along the sides of the boiler cavity. The circular top of the boiler cavity is formed from spiralled channel tubing 52. The solar boiler tubing is supported by tubing supports 53, which preferably consist of thick strip or bars of the same material as the tubing, on the sides and top. A counter flow sodium line 24 rises to solar boiler attached to the boiler supports 9. A sodium fluid line 54 diverges from line 24 and merges with a sodium manifold 55 at the center of the circular closed top portion of the solar boiler. Line 54 connects with the channel tubing that forms the top 52 and sides 51 of the cylindrical main solar boiler. A sodium vapor line 56 extends from the solar boiler 10, merges with line 24 and continues back down the boiler supports.

Boiler 11, which is cone shaped and intercepts rays not focused directly into the aperture 49 of the boiler 10, reflects some portion of these rays into the boiler 10. The energy not reflected, and thus absorbed, is captured for low temperature use such as for low temperature steam to clean the reflector. It is to be noted that this energy is not used in the calculation of the overall efficiency of the apparatus. A counter flow feed water line 57, preferably composed of low grade stainless steel, runs up one boiler support 9 and wraps around the brim boiler reflector sheet 58. Sheet 58, which is composed of Alcoa reflector sheet material treated with the Bright Dip 5 process, extends to the edge of the solar sodium boiler at point 59 and exits the brim boiler as process steam line 60. Line 60 extends down along the boiler shape-maintaining support 48 and merges with the counter flow water line 57 at the location designated 61. High temperature insulation 62 (preferably comprising diamatious earth next to metal) fills the space between the cylindrical main solar boiler 10, the boiler 11, and the outer skin 63 of the entire boiler assembly. To prevent solar boiler damage or melt down, sodium vapor temperature sensor 71 turns on a sodium pump (see element 22 in FIG. 2) to move more sodium through the boiler when the temperature of sodium vapor in vapor line 56 rises above an acceptable degree of superheat. Vapor sensor 71 overrides the thermal storage sodium vapor sensor 70 shown in FIG. 5.

Figure 4:
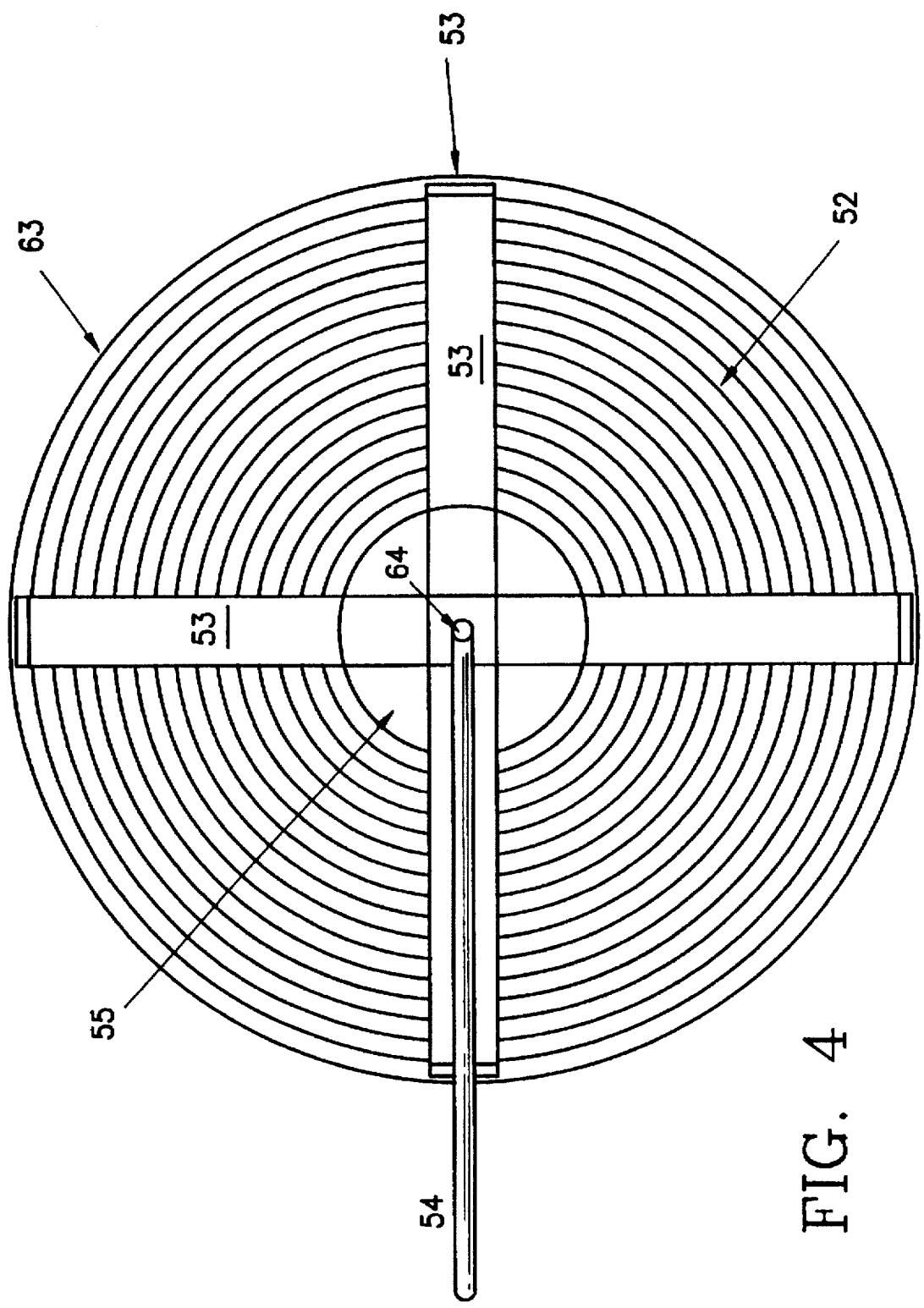
FIG. 4 is a top view of the closed cylindrical end of the boiler of FIG. 3.
Figure 4A:
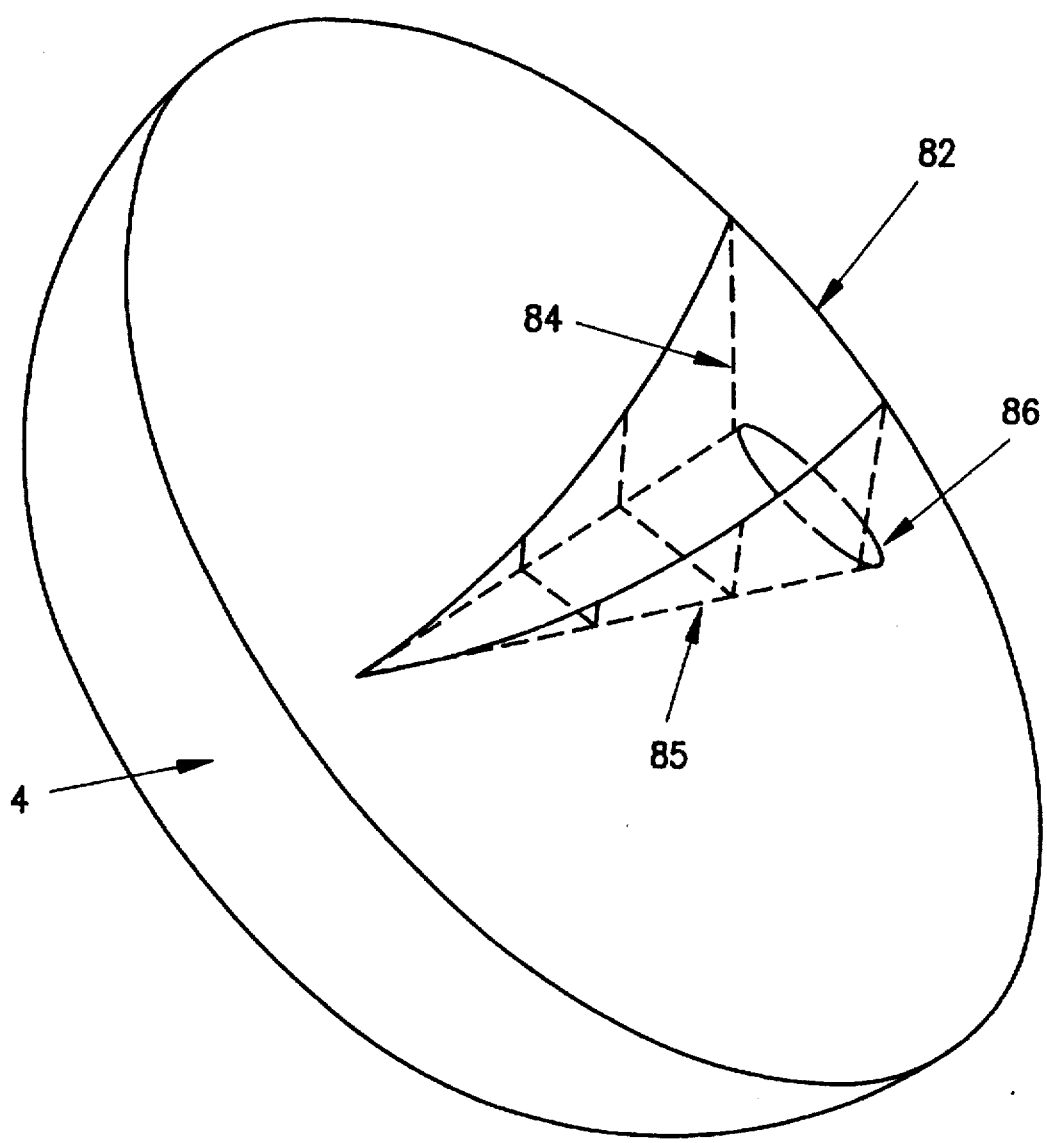
FIG. 4a shows the parabolic reflector 4 of FIG. 1, and one reflector element in detail.

FIGS. 3 and 4 show the main solar boiler 10 with the sodium fluid line 54 is attached to a manifold 55 at location 64. Here, the fluid line 54 joins the spiral-wound sodium channel tubing 52, which forms the top closed end of the cylindrical cavity boiler 10. Tubing supports 53 are shown as well as the outer skin 63 of the entire boiler assembly.

Figure 5:
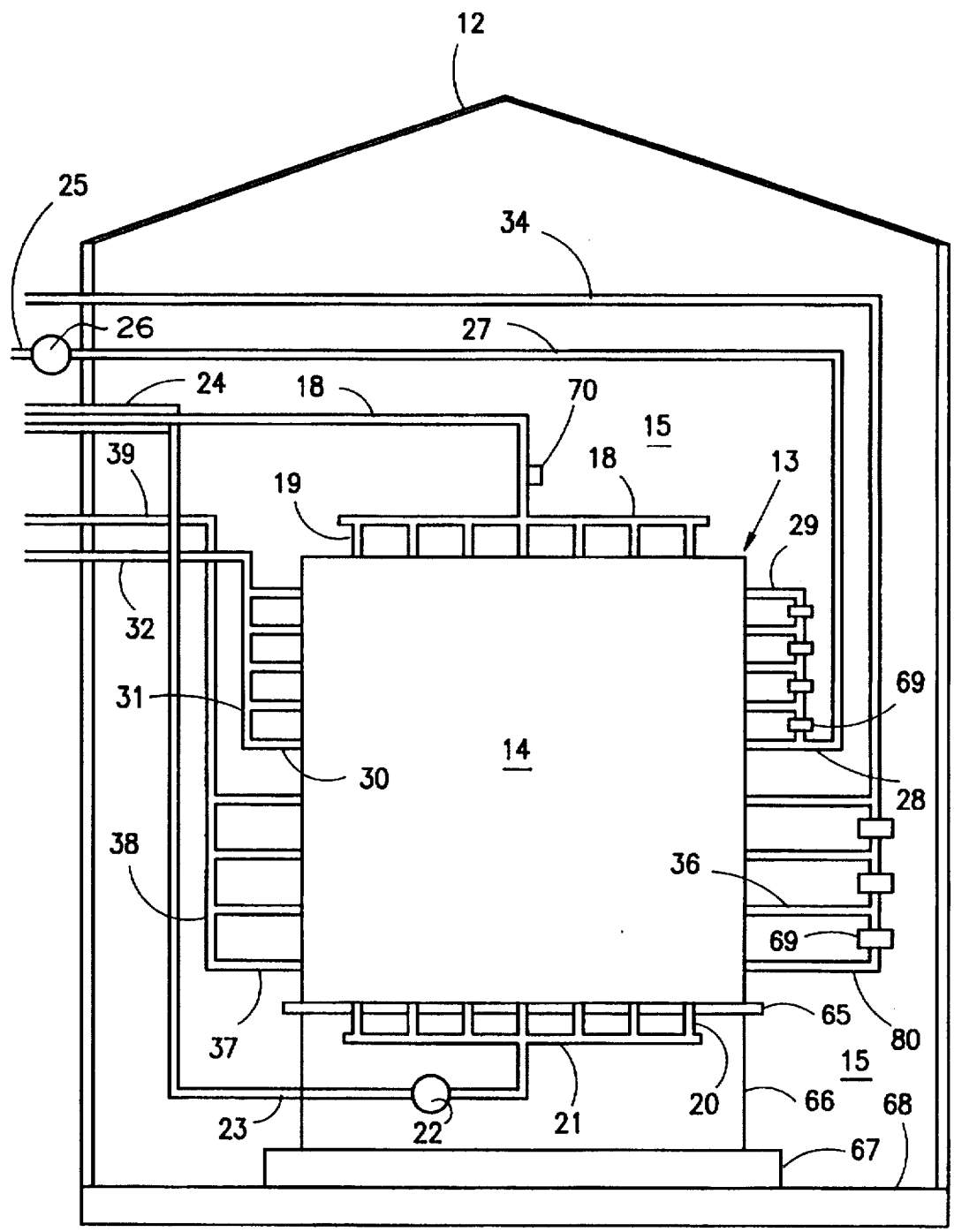
FIG. 5 illustrates the thermal storage system of the present invention.

FIG. 5 is a side view of the High Temperature Thermal Storage System (HTTSS) 12. The HTTSS includes a thermal storage tank 13, preferably comprised of Inconel or other suitable alloy adapted to contain molten sodium chloride, the thermal storage material. The HTTSS also includes an outer housing 15-A. Insulation 15 is disposed between the outer housing and the thermal storage tank. A line 16, carrying sodium vapor from the solar boiler, extends from the cylindrical support housing (see FIGS. 1 and 2 at 17) for communication with the sodium vapor headers 18 and the sodium vapor lines 19 which run into and through the thermal storage tank 13. Sodium condensate lines 20 extend from the thermal storage tank and are fluidly coupled with the sodium condensate headers 21.

An electro-magnetic fluid pump 22 pumps liquid sodium through a liquid sodium delivery fluid line 23 and back through a liquid sodium return line 24 where it is regeneratively heated as it is pumped back to the solar boiler, vaporized, and then directed back through a return counter-flow line 24 inside the sodium vapor pipe 16 and back to the sodium vapor headers 18.

A fluid line 25, extending from the cylindrical support housing 17 on support 2, is fluidly coupled to a high pressure feed water pump 26. The fluid line 25 carries water at low pressure from an air-cooled condenser. A fluid line 27, which carries water under high pressure, is coupled with several feed water heaters shown at 40b and 33b in FIG. 6 to regeneratively heat the water with partial steam bleeds coming from both high pressure steam line 33a and medium pressure steam line 40a.

It is important to point out here that the apparatus of this invention enables optimization of the efficiency of the Rankine turbine cycle. The purpose is to add the most heat energy to the working fluid, i.e., steam, at the highest average temperature. In that way, when the steam is expanded in the turbine down to the given ambient temperature, more of the energy originally put into the steam is expended as work, and less is wasted at the condenser. One way of doing this is to use some of the steam which has already been heated in the thermal storage system to preheat feedwater. Because water that has already been preheated has a higher temperature when it enters the thermal storage system, the average energy that is added is done so at a higher temperature, and a greater percentage of the energy added is thermodynamically available to do work.

Figure 6:
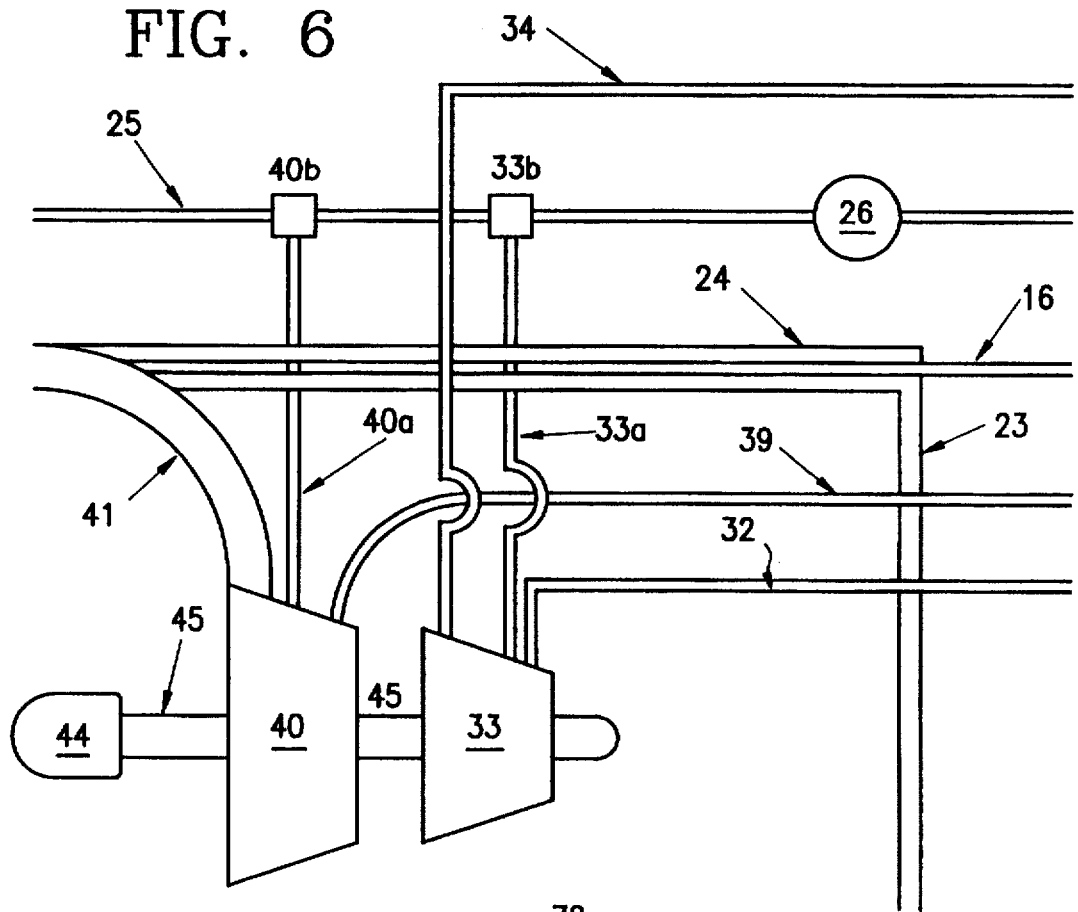
FIG. 6 is a schematic diagram of the turbine system contemplated for use with the present invention.

FIG. 6 shows the details of the turbine apparatus used with the solar boiler of the present invention. High temperature, high pressure, steam flows through conduit 32 to the high pressure section of the turbine 33. Medium temperature, medium pressure steam flows through conduit 34 from the turbine back to the thermal storage tank 13 for reheating. Steam bleeds from the high pressure section of turbine 33 through conduit 33a to mix with and regeneratively heat feed water traveling to the thermal storage tank in regenerative feedwater heater 33b. Conduit 39 carries reheated high temperature, medium pressure steam from the thermal storage tank to the medium pressure section of the turbine 40. Conduit 40a carries a partial steam bleed from the medium pressure section of the turbine 40 to mix and regeneratively heat feed water passing through the regenerative feedwater heater 40b on its way to the thermal storage tank.

Referring again to FIG. 5, the fluid line 27 is fluidly coupled with the high pressure water headers 28 which; in turn, are coupled the high pressure boiler pipes 29 that extend into and through the thermal storage tank 13. Pipes or fluid bearing lines 30 carry high pressure, high temperature steam and connect with headers or fluid-bearing pipes 31 which carry high pressure, high temperature steam. Pipes 31 are fluidly coupled with the steam line 32 and hence with the high pressure section of turbine 33 (shown in FIG. 2). A fluid-bearing line 34, extending from the exhaust section of the turbine 33, carries steam under medium pressure and medium temperature. The line 34 is fluidly coupled to the medium pressure, medium temperature headers 35. The headers 35 connect to the medium pressure, medium temperature boiler pipes 36 which run into and through the thermal storage tank. Also extending from the thermal storage tank are fluid-bearing lines or pipes 37 which carry steam at high temperature and under medium pressure. Fluid-bearing lines 37 are connected with headers 38 which extend from the thermal storage tank. The headers are fluidly coupled with steam line 39 which connects with the medium pressure section of turbine 40 (shown in FIG. 2). A fluid line 41, which carries exhaust steam from the turbine 40 at low pressure and low temperature, extends through the support housing 17 (shown in FIG. 2), and is connected to an air-cooled condenser. The condenser is connected with the fluid line 25 which carries condensate at low temperature and low pressure. Preferably, the thermal storage tank 13 is disposed atop a thick, heat resistant steel plate 65 which sits on heat resistant steel-capped, high temperature duty, elongated concrete columns 66 positioned between the rows of the sodium condensate headers 21. The concrete columns rest on high temperature duty concrete slabs 67 and 68. Temperature sensors located at steam inlets to both high and low pressure sections of the turbine activate valves 69 to increase the amount of heat delivered to the water carried in pipes 29 and 36 when the temperature drops.

This action occurs as a result of a simple feed-back loop that controls the demand-supply power cycle. When the load placed on the electrical power grid connected to the apparatus of the present invention increases above a predetermined amount, the generator is caused to slow down slightly with the turbine. An RPM sensor switches on the feed water pump 26 to pump more water to create more steam for use in creating more power in the turbine to maintain a desired level of RPM in the turbine. When more water passes through the conduits in the thermal storage system, the steam isn't heated to quite as high a temperature, and the sensor recognizes the drop in temperature and causes valves 69 (see FIG. 5) to switch open. This allows the feedwater to pass through more conduits in the thermal storage system and absorb more heat than before causing the steam at the turbine to increase in temperature. In turn, the steam generates more power and rotates the turbine faster eventually causing the RPM sensor to switch off the pump which will reduce the amount of water pumped. Thus, the temperature of the steam will rise and valves 69 will close, and equilibrium in the system will be maintained.

Electrical demand sensors on the generator activate a feedwater pump 26 to regulate the amount of feedwater pumped through the thermal storage tank for conversion to steam. A temperature sensor 70 turns off the sodium pump 22 to allow sodium vapor to stay in the solar boiler longer when the vapor temperature in the sodium vapor line 16 drops below the temperature of vaporization for sodium.

Figure 7:
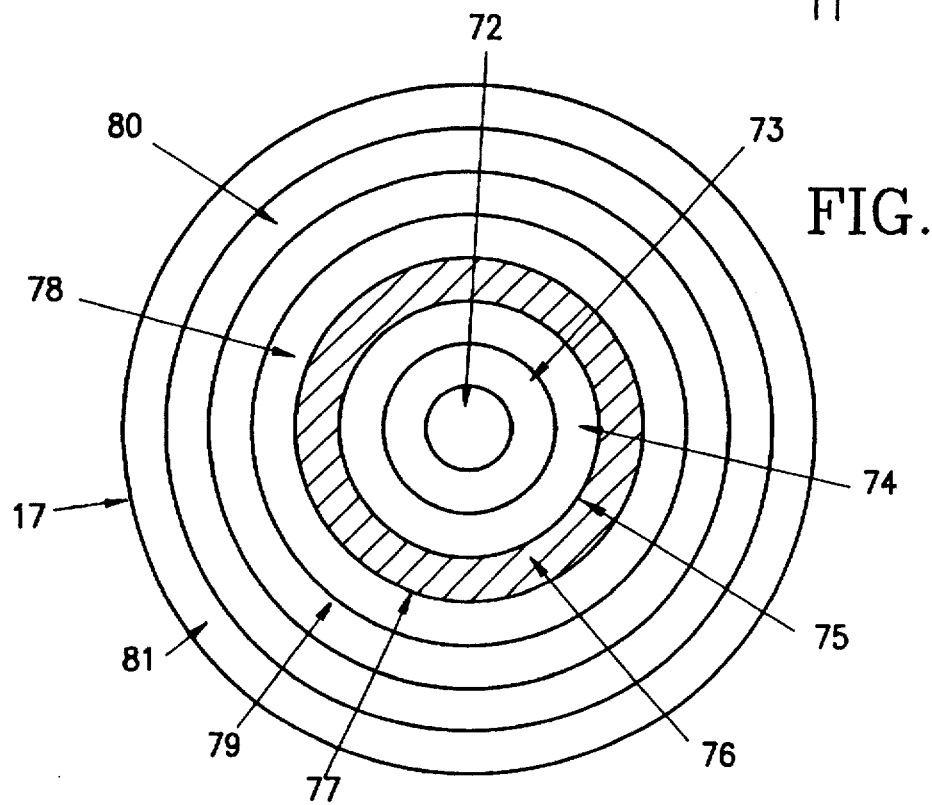
FIG. 7 is an end view of a fluid joint.

FIG. 7 is an end view of the cylindrical support housing 17 and the concentrically arranged fluid lines carried therein at the gimbal apparatus that pivotally connects the supporting frame assembly 3 to the support column 2. This arrangement of contained conduits allows both the sodium vapor condensate and the turbine exhaust steam-water condensate to pass through the same line. As shown, the innermost line 72 transports sodium vapor from the solar sodium boiler 10. The next line 73, adjacent to and encircling line 72, carries the sodium fluid from the thermal storage tank toward the solar sodium boiler. Line 73 is separated by an annular space 74 from a reflective surface 75, such as polished stainless steel, the latter being covered with a layer of thermal insulation 76 (such as diamatacious earth or other insulating material capable of functioning in a high temperature environment). The insulation 76 is provided with an outer reflective surface 77 for thermally isolating the two sets of working fluids (the sodium loop from the steam-water loop) from one another. An annular air space 78 surrounding the reflective surface 77 and located inside the annular pipe or line 79 carries the turbine exhaust vapor from the low temperature section of the turbine toward the air-cooled condenser (FIGS. 7 and 8) under the reflector in counterflow relationship with the returning low temperature, low pressure condensate in annulus 80 directed toward the feed water pump 26 and the thermal storage tank to be heated. A third air space 81 then surrounds the entire water-steam counter flow assembly.

FIGS. 8 and 9 show one of the individual pie-shaped reflector elements 4a of the reflector 4 shown in FIG. 1. FIG. 4A illustrates the relationship of each pie-shaped reflector element 82 to the entire assemblage of elements which make up the reflector dish 4. As shown, each element 82, when viewed from the top looking down, exhibits a triangular, substantially pie-shapped, peripheral configuration, with its apex at the central region of the reflector dish and its base positioned along the outer periphery of the reflector dish 4. An array of channel elements underlies and supports the assemblage of reflector elements with channel members 85 running beneath the reflector elements from the central region of the reflector dish to the periphery, and channel members 84 extending vertically from the channel members 85 to the underside of the reflector elements (as shown). Conduit member 86 shown in FIG. 4A is one segment of the exhaust steam collector ring (see also FIG. 9) which brings turbine exhaust vapor to the reflector for exposing the vapor to the cooler air and to obtain condensation of the vapor. Each individual pie-shaped reflector element surface 82 is attached to two reflector element supports 83, as shown in FIG. 8. FIG. 8 shows the pie-shapped reflector element surface 82 from the side. FIG. 9 shows the pie-shapped reflector elements support structure from below. FIG. 8A shows a perspective view of a reflector element. Preferably, each surface 82 is comprised of Alcoa reflector sheet material subjected to a Bright Dip 5υ process. Alternatively, the reflector sheet material may be any substance which provides similar or superior reflective properties. The support elements 83 are preferably composed of aluminum channel members of square or rectangular cross-sectional configuration. The elements 83 collectively, and when secured end-to-end, provide the reflector element surface 82 with the profile of a parabolic surface, preferably on the order of about 60 degrees. A 60 degree parabolic reflector is generally capable of providing the focusing power desired for the application of the present invention; however, the invention contemplates any reflector structure which will provide the solar energy focussing power required to provide the desired system output and efficiency. Support members 84 hold the reflector elements in the orientation necessary to achieve the desired parabolic curve profile and are connected to reflector element base supports 85. Supports 85 also function as primary heat exchange elements of the air cooled condenser. The low temperature, low pressure turbine exhaust steam is fluidly coupled via line 41 (see FIG. 10) with the air cooled condenser header 86. The header 86 connects with the reflector element base supports 85 and the condenser manifold 87 that gathers condensed steam water from all the reflector element base supports 85 underlying and supporting the aggregate of pie-shaped reflector elements forming the composite reflector (FIG. 1 or in FIG. 4). A condensate line 88 carries the condensate from the air-cooled condenser back to the thermal storage tank (shown in FIG. 2).

FIG. 9 is a bottom view of one of the individual pie-shaped reflector elements which collectively form the reflector 4. Header 86 of the reflector element shown in FIG. 8 is fluidly coupled with each adjacent reflector element, and with all the reflector element base supports 85. The reflector element base supports 85 connect to a centrally located air cooled manifold 87 which, in turn, is fluidly coupled to a condensate line 88. An individual pie-shaped reflector element 82 is shown positioned above the base support 85 (FIG. 4a). Spacers 89 are positioned to maintain proper lateral distance between reflector element base supports 85 and as well as to provide overall required stiffness of the individual reflector element support structure as a whole.

There has thus been described a solar energy collection, storage and conversion system which collects solar energy in a cavity boiler, transforms the solar energy to thermal energy for driving a Carnot or Rankine engine, and then converts the engine output into usable work, such as electrical energy. The conversion of solar energy to thermal energy, and the conversion of thermal energy to work-producing energy, is a function of the heat transfer material and the heat storage material used by the apparatus of this invention, namely sodium (in liquid and vapor forms) and sodium chloride, respectively. When the sodium vapor condenses, it transfers its heat of vaporization to the sodium chloride in the High Temperature Thermal Storage System which stores energy in its heat of fusion.

The energy which results from this phase of the process is available for use in driving the most efficient steam turbines known in the electric utility industry. Thus, the size of the solar collector and the land which it must occupy can be reduced to a minimum.

As to energy storage in sodium chloride, the size of the thermal storage tank 13 (FIG. 2) can be reduced to a minimum due to the fact that sodium chloride holds 7.63 KWhr per cubic foot in its heat of fusion at 1475 degrees Fahrenheit. Sodium chloride also offers a great economic advantage due to its easy availability and low cost.

Sodium vapor is the best known heat absorber at the temperatures needed to be able to transfer energy to sodium chloride at 1475 degrees F. It has to absorb energy in the neighborhood of 1640 degrees F. in the solar boiler, where for heat loss considerations the boiler has to be made small. Under these circumstances, where the boiler must be small and the incident solar flux density is quite high, sodium is the only material that can absorb the energy at as great an energy density as is required for the small boiler. No other so abundantly plentiful material is known which can absorb thermal energy at this high temperature at the required flux density. Moreover, no other set of heat transfer and storage materials are known which can be used to store as much energy in as small a volume at as high a temperature to allow as small a solar collector for a given net electrical output at as low a cost. Sodium chloride is an energy dense storage material with an extremely high thermal availability for efficient power production. For this reason, large solar collection and storage systems can store the collected energy for extended periods of time with low losses, since the surface area of any storage tank is proportionally smaller for more energy dense material. With city-sized solar collection and storage systems, i.e., systems large enough to meet a city's needs, the amount of energy gathered and stored in the summer months will typically be more than is needed and the excess energy can be efficiently stored for use in winter months when solar availability is significantly less. Thus the solar collecting and storage system described in this application can operate independently from conventional power production facilities.

The exhaust steam from the turbine is caused to circulate in the pipes that support the highly reflective reflector. This vast area of metal acts as a cooling fin allowing the steam from the turbine to condense at a temperature close to the ambient air temperature. By condensing at a low temperature due to the great heat sink afforded, the efficiency at the turbine is increased. Also the self-contained air-cooled condenser provides a solar collection system that can be located away from sources of cooling water which most likely is in short supply in areas that have the greatest energy, such as the desert and semi-arid areas.

What I claim as my invention is:

1. A solar energy system, comprising:

solar energy concentrating means;

means for transferring heat from concentrated solar energy to a fluid, including a counterflow means for heating said fluid before said fluid enters said solar energy means;

thermal storage means for storing said transferred heat into a storage medium;

means, interacting with the energy in said thermal storage means, for producing work; and, fluid conduit means fluidly coupling said solar energy concentrating means, said thermal storage means, and said work producing means;

wherein said storage medium is sodium chloride.

2. The solar energy system of claim 1, wherein said fluid is sodium vapor.

3. The solar energy system of claim 1, wherein said solar energy concentrating means includes solar energy collecting means and means for optimizing the position of said solar energy collecting means relative to the movement of the sun about the earth's axis.

4. The solar energy system of claim 3, wherein said solar collecting means includes a focal point and said means for converting the focused solar energy to heat is located in the region of said focal point.

5. The solar energy system of claim 4, wherein said means for converting the focused solar energy to heat comprises a cavity-type solar boiler.

6. The solar energy system of claim 3, wherein said solar energy concentrating means comprises a parabolic reflector supported for pivoting about an axis, and said means for optimizing the position of said solar energy collecting means relative to the movement of the sun about the earth's axis comprises means for tracking the rotation of said earth about its axis of rotation, means for pivoting said reflector about its axis.

7. The solar energy system of claim 1, wherein said means for producing work comprises turbine means driven by a second fluid.

8. The solar energy system of claim 7, wherein said second fluid comprises high pressure steam.

9. The solar energy system of claim 7, wherein said turbine means is fluidly coupled with said thermal storage means for converting energy in fluid received from said thermal storage means to usable output energy.

10. The solar energy system of claim 1, and further including control means for optimizing the efficiency of the process of converting the solar energy to work in the form of usable output energy.

11. A solar energy system, comprising:
(a) solar energy concentrating means;
(b) heat storage means including heat exchange means;
(c) work producing means;
(d) first conduit means for transporting a first medium between the solar energy concentrating means and the heat storage means, said first medium is able to transfer energy to said heat storage means at 1475° F.;
(e) second conduit means for transporting a second medium between the heat storage means and the work producing means; and,
(f) sodium chloride in said heat storage means for storing heat from said solar energy concentrating means.

12. The solar energy system of claim 11, wherein said first medium comprises sodium in a first state as it is transported from said solar energy concentrating means to said heat storage means, and sodium in a second state as it is transported from said heat storage means to said solar energy concentrating means.

13. The solar energy system of claim 12, wherein said first state is a vapor state, and said second state is a liquid state.

14. The solar energy system of claim 11, wherein said heat exchange means comprises two heat exchangers.

15. The solar energy system of claim 14, wherein said second medium comprises water in a first state as it is transported from said heat storage means to said work producing means and water in a second state as it is transported from said work producing means to said heat storage means.

16. The solar energy system of claim 15, wherein said first state is a vapor state, and said second state is a liquid state.

17. The solar energy system of claim 11, wherein said solar energy concentrating means comprises a parabolic reflector means including a plurality of pie-shaped elements, and said work producing means comprises a turbine.

18. The solar energy system of claim 11, wherein said solar energy concentrating means comprises a solar boiler that transfers concentrated heat to said first medium via fluid conduits.

* * * * *